United States Patent Office 2,939,583
Patented June 7, 1960

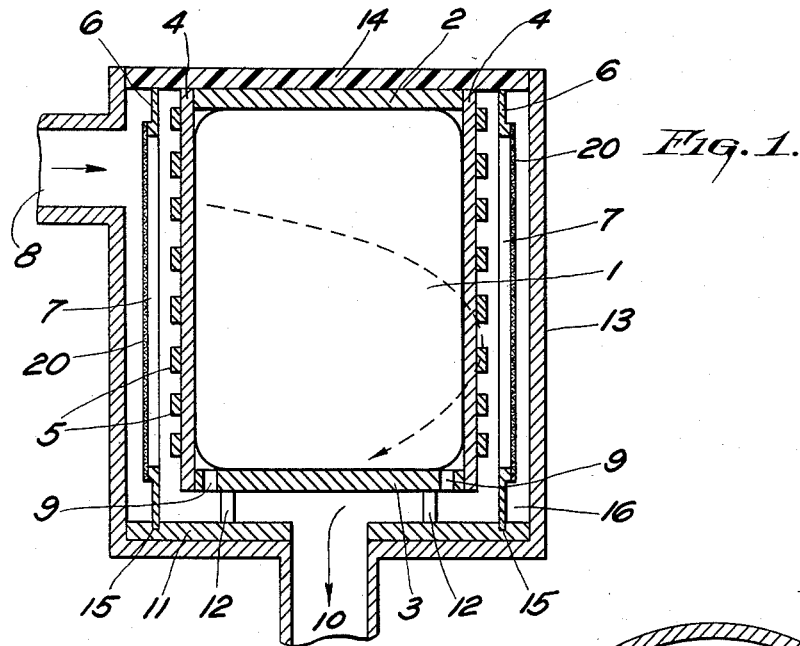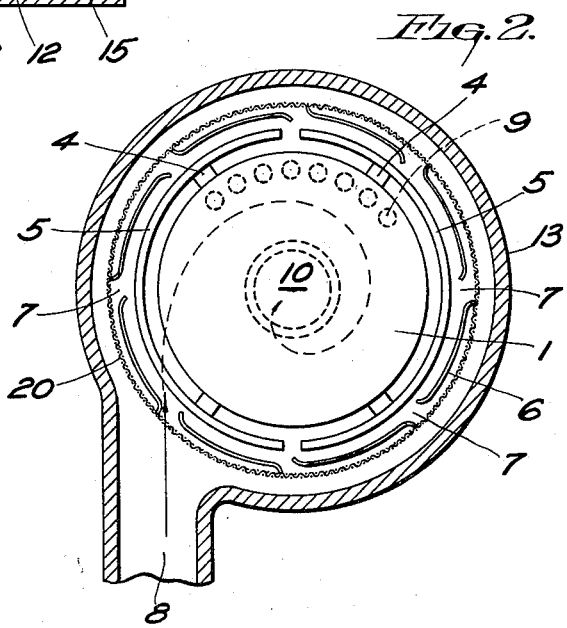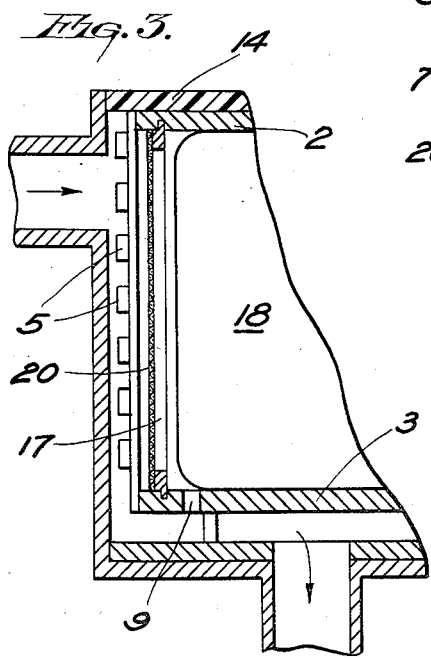

2,939,583

MAGNETIC FILTER WITH ROTARY FLOW

Wolfgang Hett, Hamburg-Wandsbek, Germany, assignor to North American Philips Company, Inc., New York, N.Y., a corporation of Delaware Filed Oct. 3, 1957, Ser. No. 687,931

Claims priority, application Germany Oct. 26, 1956

7 Claims. (Cl. 210—223)

The present invention relates to magnetic filters.

The operation of magnetic filters depends not only upon the magnetic values but also upon the rate of flow of the medium to be purified. Consequently, the efficiency of a magnetic filter is improved by increasing the magnetically active surface and the field strength or by decreasing the rate of flow of the medium, which is tantamount to increasing the time during which the magnetic field is operative. For structural and operational reasons, however, limitations are imposed upon these factors.

The present invention relates to magnetic filters comprising a separating member in the form of a cage of magnetically soft material, which filter serves to free fluids from particles present therein, without increasing the hitherto usual size of the filter and without adversely affecting the rates of flow of the media, thus increasing the efficiency of the filter.

The magnetic filter according to the invention has the feature that the medium to be purified is moved as a rotating turbulent stream or current past the separating member, which flow is brought about through a cylindrical part disposed either before or between the separating member and a permanent magnet, the size of its apertures being matched to the size of the particles to be separated.

According to the invention, the cylindrical part producing the rotary turbulent flow may advantageously also serve as a mechanical preliminary filter by lining or covering the apertures with sieves or a material acting like a sieve.

In order that the invention may be readily carried into effect, it will now be described in detail with reference to the accompanying drawing, in which:

Fig. 1 is a longitudinal sectional view of an embodiment of the present invention;

Fig. 2 is a cross-sectional view of the embodiment of Fig. 1; and

Fig. 3 is a modification of the embodiment of Fig. 1.

Secured to pole plates 2 and 3 of a permanent magnet, which has been magnetized in axial direction, is a cage 4 consisting of soft iron rings 5. The cage 4 is surrounded by a sleeve or cylindrical member 6 constituting the cylindrical part and provided with longitudinal slots 7. At least one edge of the cylindrical member 6 at each of the slots 7 is bent to extend at an angle from the surface of said cylindrical member. The bending angle and the size of each slot are so chosen for promoting the flow that the fluid entering at 8 circulates about the separating member, that is, the soft iron rings 5, in the form of an evenly rotating stream or turbulent current. The purified medium is carried off via holes 9 of the pole plate 3 through the outlet 10. Both the sleeve or cylindrical member 6 and the pole plate 3 may rest on a base plate 11; the pole plate may be secured, for example, by means of bolts 12.

It is advantageous to provide the inlet opening 8 tangentially with regard to the filter housing 13. It has, however, been found that a radial inlet opening also yields an improved filtering effect. As a matter of fact, the increase in the rate of flow yields a better separation since the medium is longer exposed to the magnetically active surfaces.

Therefore, the sleeve 6 may at the same time act as a mechanical preliminary filter by lining or covering the slots or apertures with sieves or with material acting like a sieve, such as, for example, that shown as component 20 in Figs. 1, 2, and 3. Slots covered with sintered material proved particularly advantageous.

For cleaning, the filter unit is removed from the housing. For this purpose, the cover 14 is removed and the magnetic filter and the sleeve are taken out. After rinsing and flushing, the sleeve and the magnetic filter are reintroduced into the housing. The base plate 11 may be provided with a guide slot 15 to receive the sleeve 6, and the base plate may be so constructed as to collect any deposits trapped by the mechanical preliminary filter in the space 16.

In a modified form of the magnetic filter according to the invention shown in Fig. 3, the cylindrical member 17 in the form of a sleeve is disposed between the magnet 18 and a soft iron cage 5 surrounding the latter.

While the invention has been described by means of a specific example and in specific embodiments, I do not wish to be limited thereto, for obvious modifications will occur to those skilled in the art without departing from the spirit and scope of the invention.

What is claimed is:

1. A magnetic filter comprising a housing, a cage-like separating structure of magnetizable material positioned in said housing, a magnet positioned in operative relationship to said structure for providing a magnetic flux in said structure whereby particles in a fluid to be filtered are attracted to the said structure, means for supplying a rotary turbulent stream of said fluid to said structure, said last-mentioned means comprising a substantially cylindrical member positioned substantially coaxially with said structure in said housing and means for supplying said fluid substantially tangentially to said member, said member having a plurality of longitudinal slots therein, at least one edge of said member at each of said slots being bent to extend at an angle from the surface of the said member, and means for removing said fluid from said housing.

2. A magnetic filter comprising a housing, a cage-like separating structure of magnetizable material positioned in said housing, a magnet positioned in operative relationship to said structure for providing a magnetic flux in the said structure whereby particles in a fluid to be filtered are attracted to the said structure, means for supplying a rotary turbulent stream of said fluid to said structure, said last-mentioned means comprising a substantially cylindrical member positioned substantially coaxially with said structure in said housing and means for supplying said fluid substantially tangentially to said member, said member having a plurality of longitudinal slots therein, at least one edge of said member at each of said slots being bent to extend at an angle from the surface of the said member, mechanical filtering means positioned over said slots, and means for removing said fluid from said housing.

3. A magnetic filter comprising a housing, a cage-like separating structure of magnetizable material positioned in said housing, a magnet positioned in operative relationship to said structure for providing a magnetic flux in the said structure whereby particles in a fluid to be filtered are attracted to the said structure, means for supplying a rotary turbulent stream of said fluid to said structure, said last-mentioned means comprising a substantially cylindrical member positioned substantially coaxially with and around said structure in said housing and means for supplying said fluid substantially tangentially to said member, said member having a plurality of longitudinal slots therein, at least one edge of said member at each of said slots being bent to extend at an angle from the surface of the said member, and means for removing said fluid from said housing.

4. A magnetic filter comprising a housing, a cagelike separating structure of magnetizable material positioned in said housing, a magnet positioned in operative relationship to said structure for providing a magnetic flux in the said structure whereby particles in a fluid to be filtered are attracted to the said structure, means for supplying a rotary turbulent stream of said fluid to said structure, said last-mentioned means comprising a substantially cylindrical member positioned substantially coaxially with and around said structure in said housing and means for supplying said fluid substantially tangentially to said member, said member having a plurality of longitudinal slots therein, at least one edge of said member at each of said slots being bent to extend at an angle from the surface of the said member, mechanical filtering means positioned over said slots, and means for removing said fluid from said housing.

5. A magnetic filter comprising a housing, a cagelike separating structure of magnetizable material positioned in said housing, a magnet positioned in operative relationship to said structure for providing a magnetic flux in the said structure whereby particles in a fluid to be filtered are attracted to the said structure, means for supplying a rotary turbulent stream of said fluid to said structure, said last-mentioned means comprising a substantially cylindrical member positioned substantially coaxially with and interposed between said magnet and said structure in said housing and means for supplying said fluid substantially tangentially to said member, said member having a plurality of longitudinal slots therein, at least one edge of said member at each of said slots being bent to extend at an angle from the surface of the said member, and means for removing said fluid from said housing.

6. A magnetic filter comprising a housing, a cagelike separating structure of magnetizable material positioned in said housing, a magnet positioned substantially coaxially with and inside said structure for providing a magnetic flux in the said structure whereby particles in a fluid to be filtered are attracted to the said structure, means for supplying a rotary turbulent stream of said fluid to said structure, said last-mentioned means comprising a substantially cylindrical member positioned substantially coaxially with and interposed between said magnet and said structure in said housing and means for supplying said fluid substantially tangentially to said member, said member having a plurality of longitudinal slots therein, at least one edge of said member at each of said slots being bent to extend at an angle from the surface of the said member, and means for removing said fluid from said housing.

7. A magnetic filter comprising a housing, a cagelike separating structure of magnetizable material positioned in said housing, a magnet positioned substantially coaxially with and inside said structure for providing a magnetic flux in the said structure whereby particles in a fluid to be filtered are attracted to the said structure, means for supplying a rotary turbulent stream of said fluid to said structure, said last-mentioned means comprising a substantially cylindrical member positioned substantially coaxially with and interposed between said magnet and said structure in said housing and means for supplying said fluid substantially tangentially to said member, said member having a plurality of longitudinal slots therein, at least one edge of said member at each of said slots being bent to extend at an angle from the surface of the said member, mechanical filtering means positioned over said slots, and means for removing said fluid from said housing.

References Cited in the file of this patent

UNITED STATES PATENTS

| | | |
|---|---|---|
| 1,425,366 | Chapman | Aug. 8, 1922 |
| 2,317,774 | Kiek et al. | Apr. 27, 1934 |
| 2,732,943 | Hagberg | Jan. 31, 1956 |

FOREIGN PATENTS

| | | |
|---|---|---|
| 272,784 | Great Britain | June 23, 1927 |

UNITED STATES PATENT OFFICE

CERTIFICATE OF CORRECTION

Patent No. 2,939,583 June 7, 1960

Wolfgang Hett

It is hereby certified that error appears in the above numbered patent requiring correction and that the said Letters Patent should read as corrected below.

In the heading to the printed specification, line 7, for "Claims priority, application Germany Oct. 26, 1956" read -- Claims priority, application Germany Oct. 22, 1956 --.

Signed and sealed this 20th day of December 1960.

(SEAL)
Attest:

KARL H. AXLINE
Attesting Officer

ROBERT C. WATSON
Commissioner of Patents